(12) United States Patent
Adriansson et al.

(10) Patent No.: US 11,304,399 B2
(45) Date of Patent: Apr. 19, 2022

(54) SEAL IN A TEAT CLEANER AND A TEAT CLEANER

(71) Applicant: DELAVAL HOLDING AB, Tumba (SE)

(72) Inventors: Frank Adriansson, Tumba (SE); Nils-Erik Holmertz, Tumba (SE)

(73) Assignee: DeLaval Holding AB, Tumba (SE)

( * ) Notice: Subject to any disclaimer, the term of this patent is extended or adjusted under 35 U.S.C. 154(b) by 592 days.

(21) Appl. No.: 16/322,393

(22) PCT Filed: Oct. 23, 2017

(86) PCT No.: PCT/SE2017/051037
§ 371 (c)(1),
(2) Date: Jan. 31, 2019

(87) PCT Pub. No.: WO2018/080380
PCT Pub. Date: May 3, 2018

(65) Prior Publication Data
US 2019/0174708 A1 Jun. 13, 2019

(30) Foreign Application Priority Data

Oct. 27, 2016 (SE) .................................. SE1651406-9

(51) Int. Cl.
*A01J 7/04* (2006.01)
*A01J 5/08* (2006.01)
(Continued)

(52) U.S. Cl.
CPC . *A01J 7/04* (2013.01); *A01J 5/08* (2013.01); *A01K 13/001* (2013.01); *F16J 15/104* (2013.01)

(58) Field of Classification Search
CPC ...... A01J 7/04; A01J 7/025; A01J 5/06; A01J 5/04; A01J 5/047; A01J 5/0075;
(Continued)

(56) References Cited

U.S. PATENT DOCUMENTS 2,532,088 A 11/1950 Cordis
4,305,346 A * 12/1981 Sparr, Sr. ............... A61D 11/00
119/670

(Continued)

FOREIGN PATENT DOCUMENTS

EP 0728412 A1 8/1996
EP 1 217 885 A1 7/2002
(Continued)

OTHER PUBLICATIONS

International Search Report and Written Opinion, dated Jan. 17, 2018, from corresponding PCT application No. PCT/SE2017/051037.

(Continued)

*Primary Examiner* — Peter M Poon
*Assistant Examiner* — Jeffrey R Larsen
(74) *Attorney, Agent, or Firm* — Nixon & Vanderhye

(57) ABSTRACT

A teat cleaning cup (130) for cleaning a teat (120) includes a teat cleaner (300) having an inner body (270) forming a central cavity (280) for enclosing the teat (120), the inner body (270) including an inner surface (271), an outer surface (272), and a set of apertures (275) extending from the outer surface (272) to the inner surface (271); an exterior part (220) enclosing the inner body (270); a set of channels (291, 292), which set of channels (291, 292) connects to the set of apertures (275); a lower part (230) removably attached to the teat cleaner (300), which lower part (230) includes at least one cleaning liquid valve (240, 260), and a drain (250); and
(Continued)

a seal (235) configured to distribute liquid from the cleaning liquid valve (240, 260) into the set of channels (291, 292).

18 Claims, 7 Drawing Sheets

(51) Int. Cl.
  *A01K 13/00*    (2006.01)
  *F16J 15/10*    (2006.01)

(58) Field of Classification Search
  CPC ........ A01J 5/16; A01J 7/00; A01J 7/02; A01J 9/00; A01J 5/044; A01J 5/08; A01J 5/02
  USPC ................... 119/670, 664, 652, 14.47, 14.27
  See application file for complete search history.

(56) References Cited

U.S. PATENT DOCUMENTS

| | | | |
|---|---|---|---|
| 4,530,307 A * | 7/1985 | Thompson | A01J 5/08 119/14.49 |
| 5,415,130 A * | 5/1995 | Brackett | B05B 15/74 119/670 |
| 6,557,488 B1 * | 5/2003 | Schuster | A01J 5/08 119/14.49 |
| 6,591,784 B1 * | 7/2003 | Eriksson | A01J 7/04 119/14.08 |
| 9,258,976 B2 | 2/2016 | Alveby et al. | |
| 2002/0185071 A1 | 12/2002 | Guo | |
| 2004/0231603 A1 | 11/2004 | Bjork et al. | |
| 2005/0045108 A1 | 3/2005 | Wipperfurth et al. | |
| 2005/0274327 A1 | 12/2005 | Johnsson | |
| 2012/0145083 A1 * | 6/2012 | Van Den Berg | A01J 7/04 119/14.08 |
| 2015/0334979 A1 | 11/2015 | Roytek | |

FOREIGN PATENT DOCUMENTS

| | | |
|---|---|---|
| WO | 03/098998 A1 | 12/2003 |
| WO | 2012/071000 A1 | 5/2012 |

OTHER PUBLICATIONS

Swedish Search Report, dated Jun. 30, 2017, from corresponding SE application No. 1651406-9.

* cited by examiner

SECTION A-A

SECTION B-B

SECTION B-B

SEAL IN A TEAT CLEANER AND A TEAT CLEANER

TECHNICAL FIELD

This document discloses a seal and a teat cleaning cup. More particularly, a seal and a teat cleaning cup are described, wherein the seal is configured to seal between parts of the teat cleaning cup.

BACKGROUND

Before commencing milking of dairy animals, it has to be ensured that the teats of the animal are clean. Various solutions to this problem have been suggested. One in particular advantageous solution for cleaning teats of an animal is disclosed in the European patent EP 1217885 B1. The teat cleaning cup described therein is mainly compounded by an inner tube comprising a plurality of nozzle holes for spraying liquid/air on the teat, and an outer plastic sleeve enclosing the inner tube.

Distributing liquid to the teats, from a cleaning liquid supply, is made via Y-shaped channels. These Y-shaped channels are complicated to manufacture and difficult to depurate during washing.

Further it is difficult to assemble and disassemble the teat cleaning cup, leading to more work/high costs during manufacture and service. It would be desired to reduce the number of parts.

Teats of the animals may sometimes be very dirty, as the animals (free range animals) may rest directly on the ground, which may be muddy and/or comprise manure. It would for this reason be desired to further improve the efficiency of teat cleaning.

SUMMARY

It is therefore an object of this invention to solve at least some of the above problems and improve a teat cleaning cup for teat cleaning of an animal.

According to a first aspect of the invention, this objective is achieved by a seal in a teat cleaning cup for cleaning a teat of an udder. The seal is configured to seal between a teat cleaner forming a central cavity configured to enclose the teat, and a lower part. The lower part is removably attached to the teat cleaner, which lower part comprises at least one cleaning liquid valve connectable to a cleaning liquid supply, and a drainage means for draining used cleaning liquid from the teat cleaner. The seal comprises a first surface facing the teat cleaner and a second surface facing the lower part. The seal is also configured to distribute liquid from the cleaning liquid valve of the lower part into a set of channels in the teat cleaner, which set of channels are extending along a longitudinal direction of the test cleaner to the central cavity, where the set of channels are connected via a set of apertures in an inner body of the test cleaner to the central cavity.

According to a second aspect of the invention, this objective is achieved by a teat cleaning cup for cleaning a teat of an udder. The teat cleaning cup comprises a test cleaner, a lower part and a seal, according to the first aspect. The teat cleaner comprises an inner body, forming a central cavity configured to enclose a teat of the udder. The inner body comprises an inner surface, facing the central cavity, an outer surface, and a set of apertures, extending from the outer surface to the inner surface. The teat cleaner also comprises an exterior part, enclosing the inner body. A set of channels are situated between the inner body and the exterior part, which set of channels extend along a longitudinal direction of the teat cleaner and connect to the set of apertures. The lower part is removably attached to the teat cleaner. The lower part comprises at least one cleaning liquid valve connectable to a cleaning liquid supply, and a drainage means for draining used cleaning liquid from the teat cleaner.

Thanks to the described aspects, by reducing the number of parts comprised in the teat cleaning cup, e.g. by making the teat cleaner by injection moulding and thereby fuse the exterior part with the inner body, it becomes easier to assemble/disassemble the teat cleaning cup, leading to reduced manufacturing costs and a more service friendly product.

By introducing the seal, liquid from the cleaning liquid valve of the lower part is distributed into the channels of the teat cleaner, without introducing conduits or similar arrangements. Thereby washing and disassemble for service purpose is facilitated.

Other advantages and additional novel features will become apparent from the subsequent detailed description.

FIGURES

Embodiments of the invention will now be described in further detail with reference to the accompanying figures, in which:

FIG. 6 illustrates an example of a seal of a teat cleaning cup.

DETAILED DESCRIPTION

Embodiments of the invention described herein are defined as a seal and a teat cleaning cup comprising the seal, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
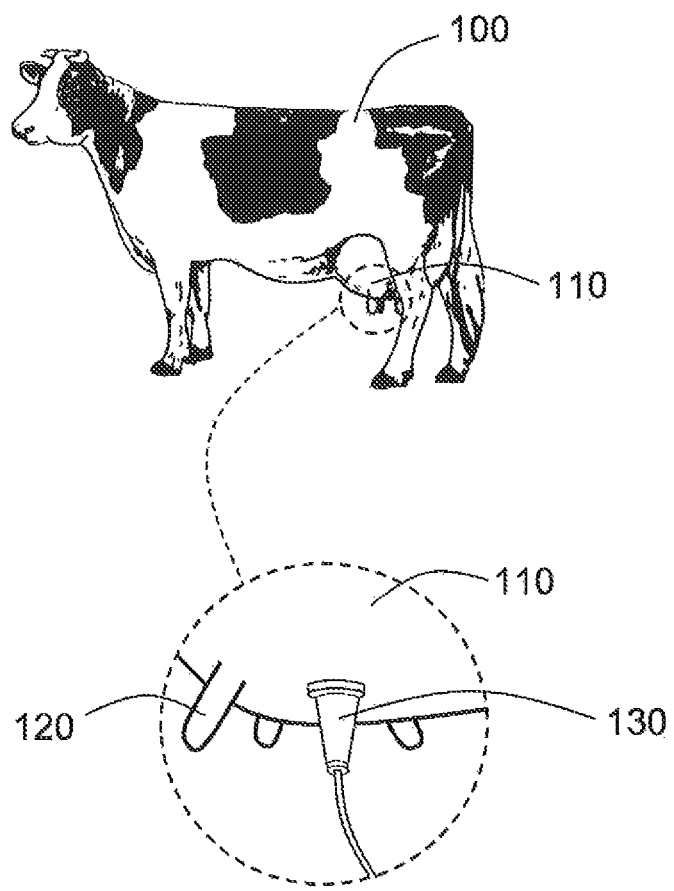
FIG. 1 illustrates a scenario where a teat cleaning cup is cleaning a teat of an animal udder of an animal.

FIG. 1 illustrates a scenario with an animal 100 comprised in a herd of animals for dairy farming.

"Animal" may be any arbitrary type of animal 100 relates to milk production. Typically, a domesticated mammal such as e.g. cow, goat, sheep, camel, horse, dairy buffalo, donkey, yak, etc.

The animal 100 typically has an udder 110, comprising a set of teats 120. The number of teats 120 on the udder 110 is different for different animals 100; for example, a sow has normally 16 teats, a cat has 8, a bear has 6, a cow has 4 while a horse, sheep, goat and human has 2, etc.

The milk of the animal 100 may be extracted e.g. by a milking device, by automatic milking in a rotary milking parlour or by an automated robotic milking system, just to mention some few arbitrary examples.

A problem appearing when milking the animal 100 is that the teats 120 may be dirty. If the dirt is allowed to enter the milking machine, the dirt may affect the quality of the milk. Also, germs and bacteria may be spread between animals 100 in a farm, which may affect the health of the herd.

It is thus important to clean the teats 120 before milking, which cleaning may be made by a teat cleaning cup 130.

In order to use the milking machine as rational as possible, it is an advantage to start stimulating the milk production of the animal 100 and pre-milk the teats 120. This may be made by stimulating the teat 120 by applying periodical under pressure pulses in the teat cleaning cup 130, as will be explained.

The teat cleaning cup 130 may operate e.g. in conjunction with, or as part of, a milking robot or an automated milking system in a dairy farm. The parts and functionality of the teat cleaning cup 130 are discussed and explained in FIGS. 2A-2D and FIGS. 3-4.

A problem with previously known teat cleaning cups 130 as briefly described in the background section is that the design comprises a multitude of parts.

Various advantages are achieved by producing the teat cleaning cup 130 by two-step injection moulding. Firstly, as two previously separate parts are moulded, the possible gap between them (due to tolerance) is eliminated. Thereby dirt and bacteria have less options to gain a foothold.

Further, the moulding eliminates requirements of the complicated and expensive machining of the prior art parts, leading to reduced production costs.

Also, due to fewer parts in the teat cleaning cup 130, it becomes easier to assemble and disassemble the teat cleaning cup 130, leading to reduced service costs.

Further, the moulding generates a more stable construction of the teat cleaning cup 130, leading to improved efficiency of the teat cleaning cup 130 since no flexing walls cause pressure loss.

Figure 4:
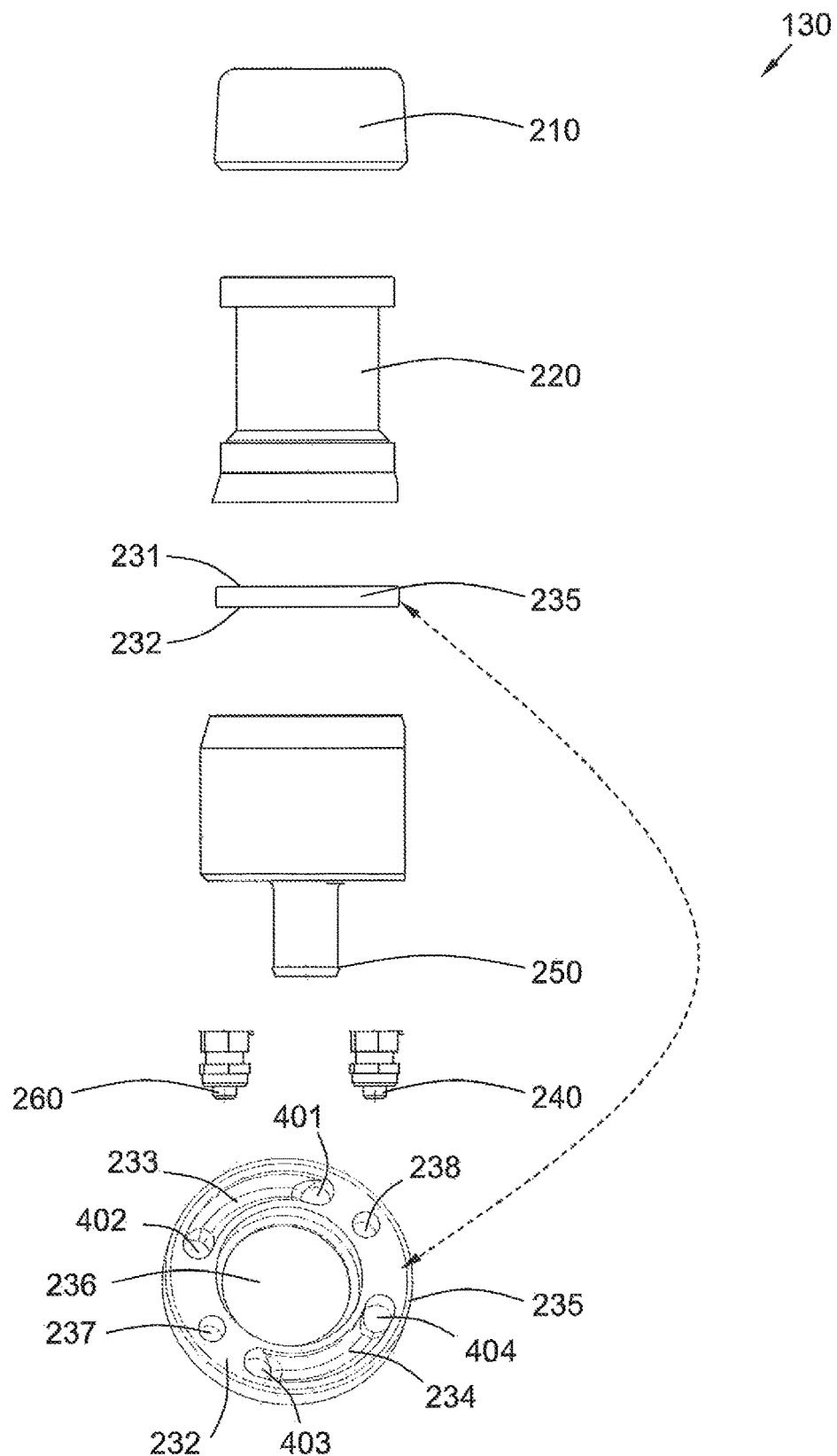
FIG. 4 illustrates an embodiment of the teat cleaning cup.
Figure 5:
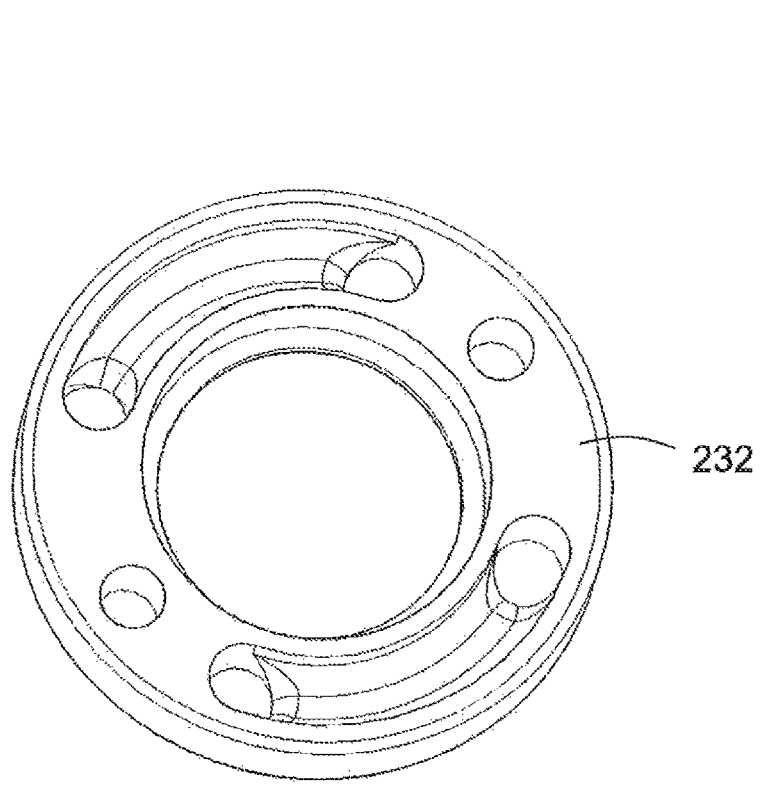
Figure 5:
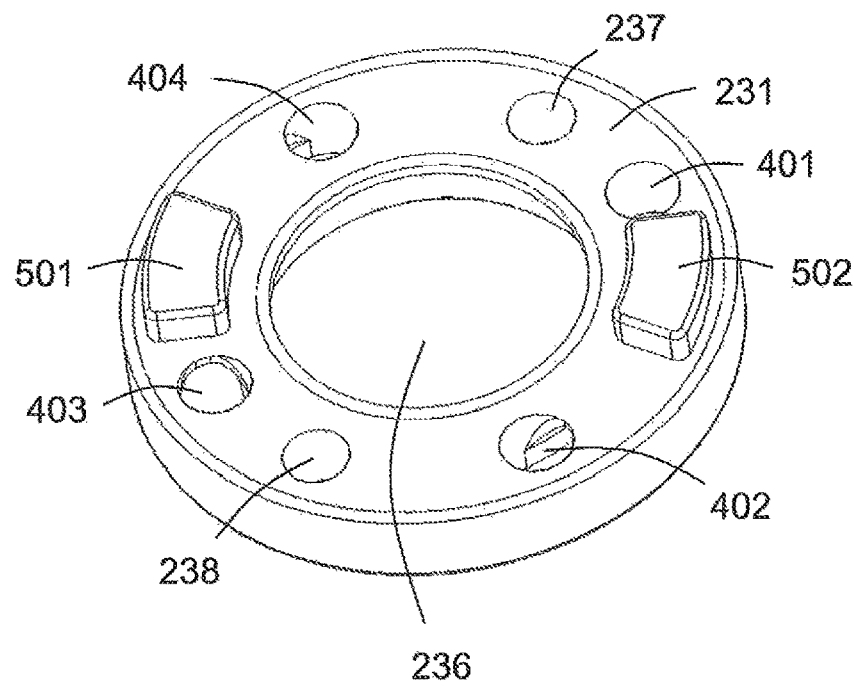

A seal is situated between a teat cleaner and a lower part of the teat cleaning cup 130, as illustrated in FIG. 4 and notably in FIG. 5. The seal, besides sealing between said parts, also is configured to distribute liquid from the cleaning liquid valve of the lower part into a set of channels in the teat cleaner.

But before discussing the seal in further detail, a presentation will be made of the teat cleaning cup 130, its functionality and its parts.

Figure 2A:
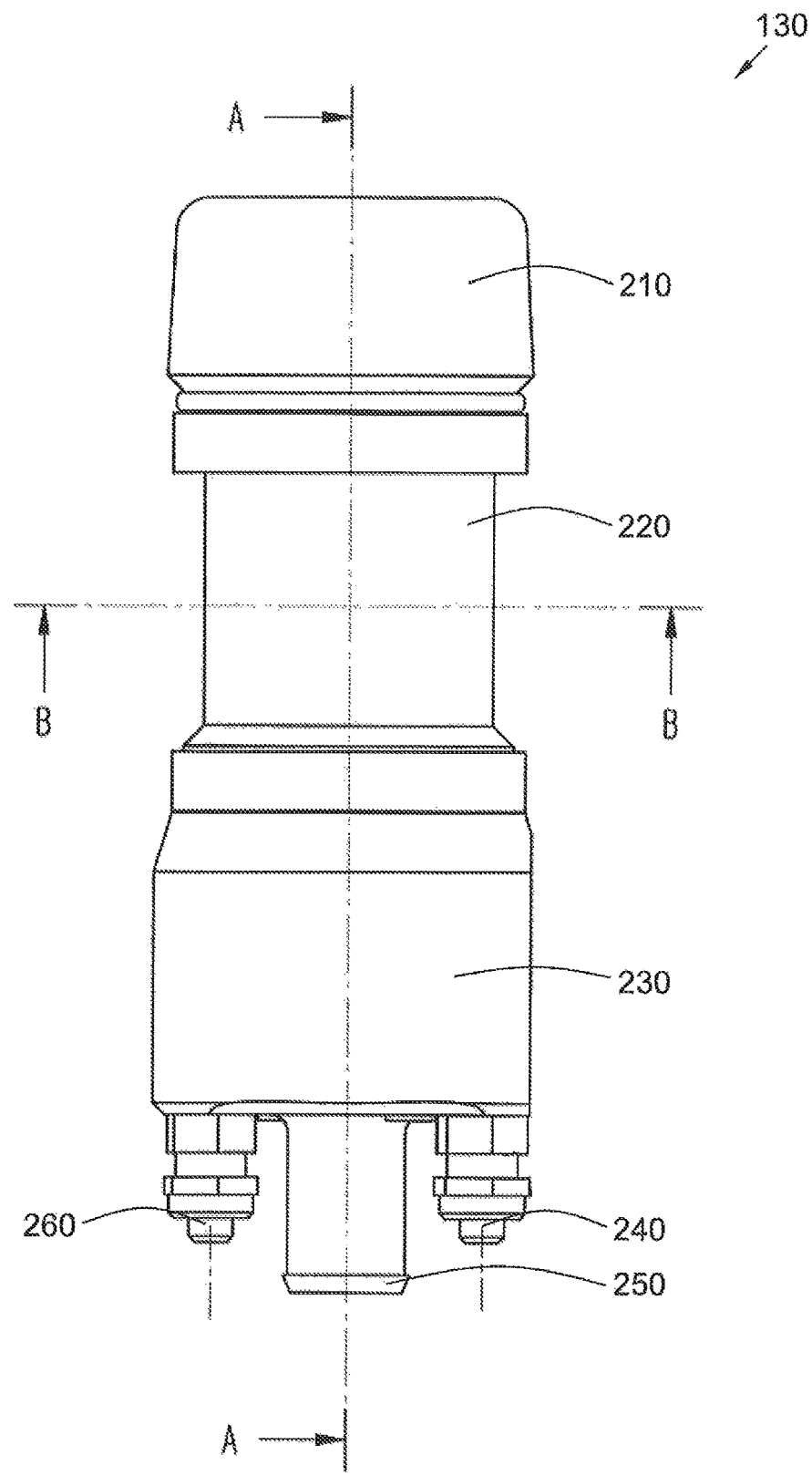
FIG. 2A illustrates an exterior view of a teat cleaning cup.

FIG. 2A illustrates an embodiment of the teat cleaning cup 130 substantially as previously described in FIG. 1.

The teat cleaning cup 130 comprises a teat cleaner, which in turn comprises an inner body and an exterior part 220, enclosing the inner body. The teat cleaning cup 130 also comprises a lower part 230 which may be realisably fastened to the teat cleaner. The lower part 230 may comprise a first cleaning liquid valve 240, a second cleaning liquid valve 260 in some embodiments, and a drainage means 250 for draining used cleaning liquid from the teat cleaning cup 130.

The teat cleaning cup 130 also may comprise a teat cleaner cup collar 210. The teat cleaner cup collar 210 may be made of rubber, silicon or similar material. The teat cleaner cup collar 210 may be fixated to the opening of the teat cleaner.

A vacuum supplying means, e.g. In the form of a non-collapsible pipe may in one of its ends connected to the drainage means 250 in the base of the teat cleaning cup 130, and with the other end to a vacuum supply for supplying an under-pressure within the teat cleaning cup 130, so as to facilitate draining used cleaning liquid from the teat cleaning cup 130 but also to enable pre-milking of the animal 100. To this end a collector waste tank may be arranged between the teat cleaning cup 130 and the vacuum supply, for collecting used cleaning liquid and extracted pre-milk (which typically is not used for human consumption). A milk detector may optionally be arranged between the teat cleaning cup 130 and the collector waste tank for detecting presence of milk in the cleaning liquid but also for possible examination of extracted pre-milk in some embodiments. In a non-limiting example, progesterone level of the milk of the animal 100 may be measured, which measurement may be used for heat detection in some embodiments. A shut off valve may be arranged between the collector waste tank and the vacuum supply, and a drain valve may be provided at the bottom of the collector waste tank.

Figure 2B:
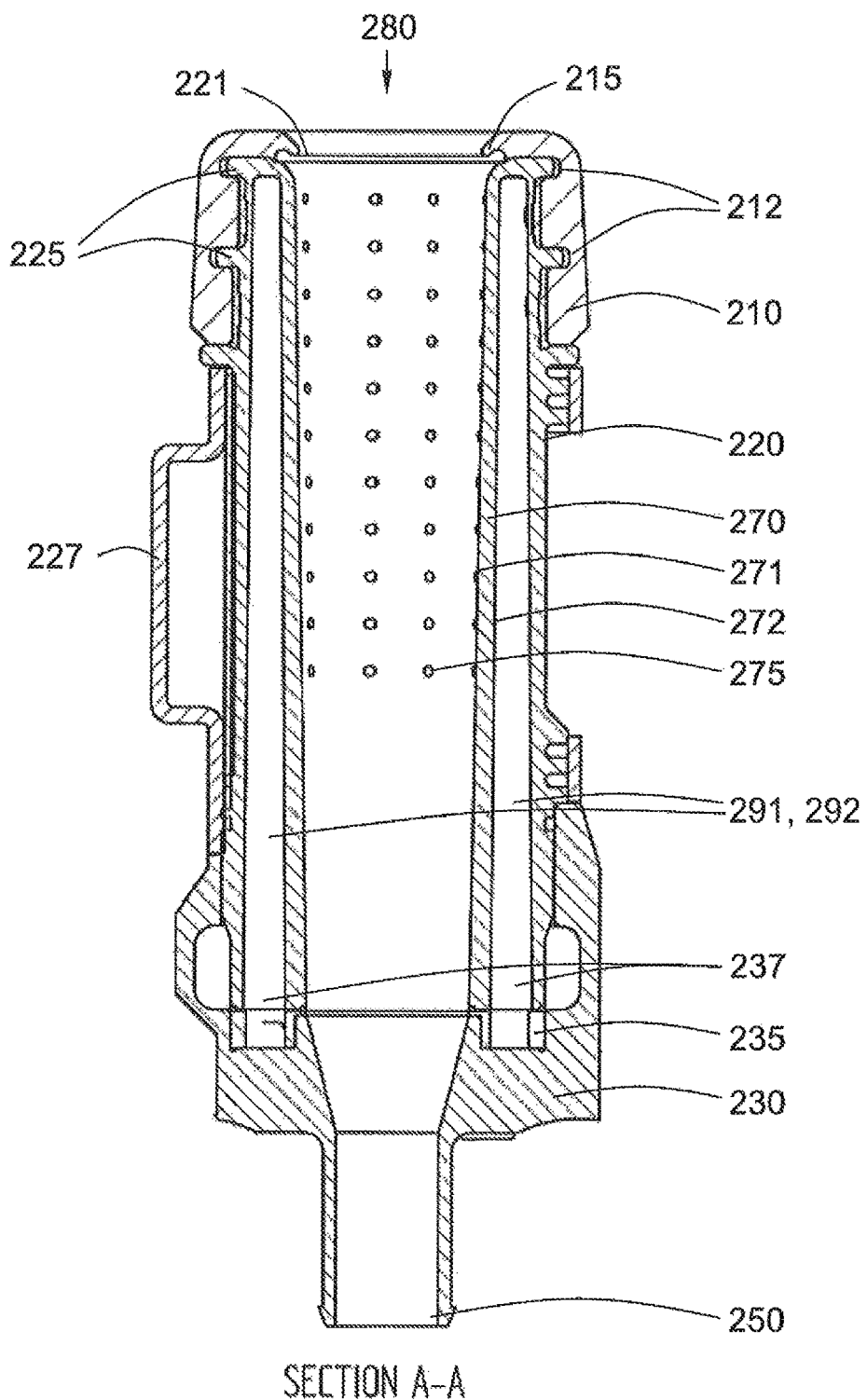
FIG. 2B illustrates a sectional view of section A-A of the teat cleaning cup in FIG. 2A.
Figure 2C:
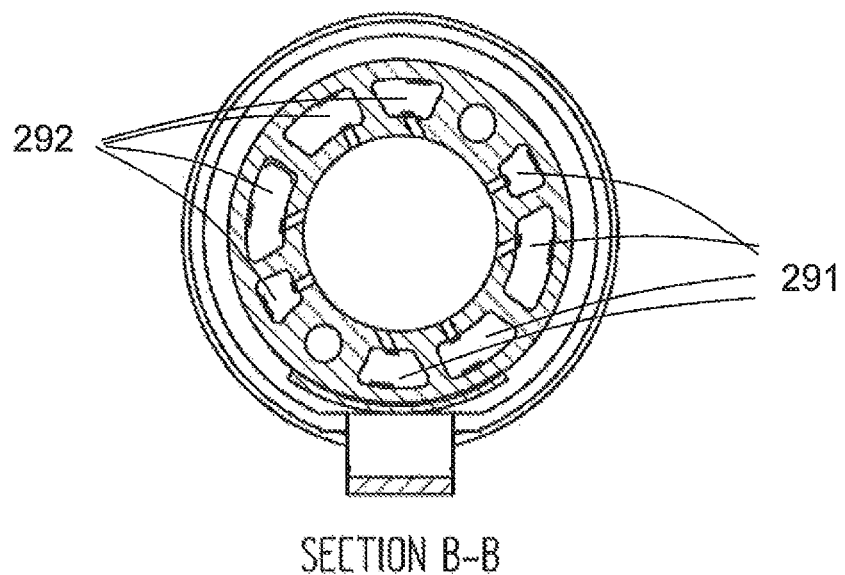
FIG. 2C illustrates a sectional view of section B-B of the teat cleaning cup in FIG. 2A.
Figure 2D:
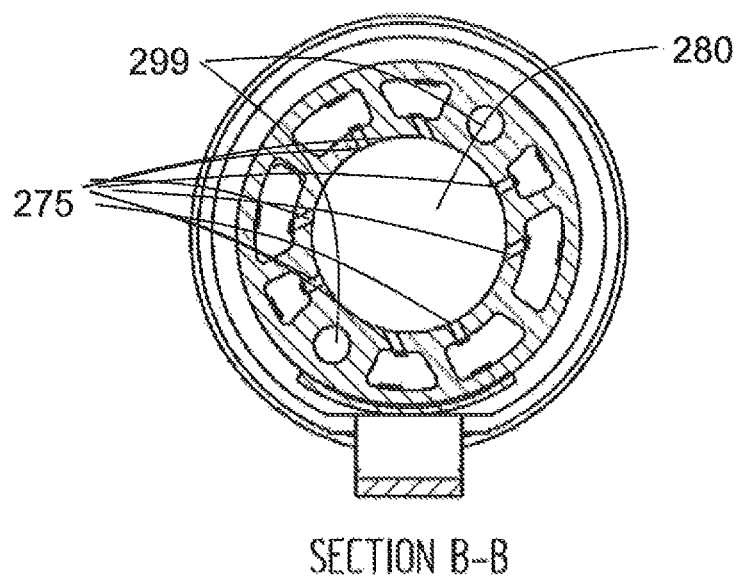
FIG. 2D illustrates a sectional view of section B-B of the teat cleaning cup in FIG. 2A.

The interior of the teat cleaning cup 130 in a first cross section A-A is illustrated in FIG. 2B and in a second cross section B-B in FIG. 2C and FIG. 2D.

FIG. 28 illustrates the cross section A-A of the teat cleaning cup 130 depicted in FIG. 2A.

The inner body 270 is forming a central cavity 280 configured to enclose a teat 120 of an udder 110. The inner body 270 comprises an inner surface 271, facing the central cavity 280 and an outer surface 272. Further, a set of apertures 275 in the inner body 270 are extending from the outer surface 272 of the inner body 270 to the inner surface 271 of the inner body 270.

Also, a set of channels 291, 292 are situated between the inner body 270 and the exterior part 220 of the teat cleaner.

The set of channels 291, 292 are connected to the set of apertures 275, and also to the first cleaning liquid valve 240 and the second cleaning liquid valve 260. Thereby, cleaning liquid may be injected into the central cavity 280 of the inner body 270 via the set of apertures 275, thereby spraying the teat 120 with the cleaning liquid.

In some embodiments, each channel 291, 292 may be connected to a plurality of apertures 275 for injecting cleaning liquid into the teat cleaning cup 130. Hereby is achieved an enhanced injection distribution of the cleaning liquid into the teat cleaning cup 130. Such plurality of apertures 275 may be arranged substantially vertically in the teat cleaning cup 130 extending from a lowermost part of the teat cleaning cup 130 to an uppermost part of the teat cleaning cup 130. Hereby is achieved that the whole length of the teat 120 is cleaned when injecting cleaning liquid through the apertures 275.

The set of channels 291, 292, which typically are elongated and longitudinal with the teat cleaning cup 130, circumferentially separated from each other, may be of two distinct types, i.e. some channels 291, 292 may be configured for transportation of cleaning liquid and/or compressed air while some channels 291, 292 are intended for transportation of ambient air of standard atmosphere pressure.

By arranging the channels 291, 292 straight without angels and corners, a smooth liquid transition is achieved, leading to a better flow through the channels 291, 292 without pressure loss. Also, cleaning of the channels 291, 292 is thereby made easier.

The channels of the first type may be configured connectable to any cleaning liquid valve 240, 260 while the channels of the second type are connected to ambient air via at least one aperture in the teat cleaner, thereby supplying said channels with air of standard atmosphere pressure.

The set of channels 291, 292 may further be divided into different groups, such as e.g., two groups; e.g. a first channel subset 291 and a second channel subset 292. Each of the channel subsets 291, 292 may comprise at least one channel from the first type of channels and at least one channel from the second type of channels.

In some such embodiments, the first channel subset 291 may be connected to the first cleaning liquid valve 240 while the second channel subset 292 may be connected to the second cleaning liquid valve 260. Further, the first channel subset 291 may advantageously be arranged on a first semi-circumferential side of the teat cleaning cup 130 while the second channel subset 292 may be arranged on the opposite semi-circumferential side of the teat cleaning cup 130.

Hereby is achieved that the teat 120 is deflecting from side to side when alternating the injection between the first channel subset 291 and the second channel subset 292. Consequently, hidden parts of the teat 120 is exposed for the injected cleaning liquid.

In some further embodiments, said first and second groups of channels may be symmetrically arranged on the first and second semi-circumferential sides of the teat cleaning cup 130. Hereby is achieved a uniformly distributed cleaning intensity of the teat 120. Hereby is achieved an enhanced cleaning action of the teat 120 and a pleasant animal experience is entertained.

The mentioning of two channel subsets 291, 292 is merely a non-limiting example; a plurality of channel subsets of each type of channels separated circumferentially in the teat cleaning cup 130 are also conceivable in some embodiments.

Each channel 291, 292 is connected to a number of apertures 275, separated circumferentially in the teat cleaner, connected to a respective channel 291, 292 of the teat cleaner.

In some alternative embodiments, the previously discussed apertures 275 may be angled tangentially with the central cavity 280 of the inner body 270, so as to allow injection of the cleaning liquid tangentially onto an inserted teat 120. Hereby is avoided a direct impact of the cleaning liquid onto the teat 120 while a whirling motion of the cleaning liquid inside the teat cleaning cup 130 is achieved, further enhancing the cleaning effect of the teat cleaning cup 130. Thereby dirt etc., may be rinsed from the teat 120, with minimal disturbance of the animal 100.

In some embodiments, the apertures 275 of the channels of the first type, for cleaning liquid transportation, may be tangentially angled, while the apertures 275 of the channels of the second type, for ambient air transportation may have any arbitrary shape, as they are intended to allow ambient air to flow through the apertures 275 into the central cavity 280.

In some further embodiments, the set of channels 291, 292 may be configured to repeatedly supply compressed-air into the teat cleaning cup 130, thereby stimulating the teat 120. Hereby is achieved that milk let-down is easier induced since the pressure in the teat cleaning cup 130 fluctuates.

Further, the inner body 270 may comprise one or several exterior flanges 225, at least partly circumventing the exterior part 220.

The teat cleaner cup collar 210 may comprise one or several recesses 212, corresponding to the exterior flanges 225 of the inner body 270. Thereby, the teat cleaner cup collar 210 may be fixated to the opening of the teat cleaner by fitting the recesses 212 of the teat cleaner cup collar 210 into the exterior flanges 225 of the inner body 270. Thereby, the teat cleaner cup collar 210 may be fixated to an upper part 221 of the teat cleaner.

The teat cleaner cup collar 210 may in some embodiments comprise an edge 215 surrounding an opening of the test cleaner cup collar 210, which opening is configured to enclose the test 120, wherein the edge 215 is configured to physically remove dirt from the teat 120 when inserted into the central cavity 280 of the teat cleaning cup 130. Thereby, a mechanical cleaning of the teat 120 is introduced, as a complement to the liquid cleaning.

The lower part 230 is removably attached to the teat cleaner, e.g. via a threaded insert, connectable to a respective fastening element for removably attaching the lower part 230 to the teat cleaner, in some embodiments.

Between the lower part 230 and the teat cleaner is a seal 235 situated. The seal 235 may seal between the lower part 230 and the teat cleaner. The seal 235 is depicted in FIGS. 4-5, and further discussed in the corresponding text sequences.

The teat cleaning cup 130 may in some embodiments comprise a handle 227, for simplifying handling of the teat cleaning cup 130, by a human and/or a robot.

FIG. 2C illustrates the cross section B-B of the teat cleaning cup 130 depicted in FIG. 2A.

The previously discussed set of channels 291 are illustrated, in this case comprising a first subset of channels 291 and a second subset of channels 292.

FIG. 2D illustrates the cross section B-B of the teat cleaning cup 130 depicted in FIG. 2A. It is actually the same cross section as illustrated in FIG. 2C, but separate figures are provided for not crowding the image with references, allowing the references to obscure the illustration.

The central cavity 280 of the teat cleaning cup 130 is intended to circumvent the teat 120 of the animal 100. The central cavity 180 communicates with the drainage means 250, or outlet, for draining used cleaning liquid from the teat cleaning cup 130. Further, vacuum (or perhaps rather: air of an air pressure lower than the current ambient air pressure) may be applied to the drainage means 250, for expanding the teat 120 and stretching the skin thereof. Thereby cracks dirt present on the teat 120 may be removed, as wrinkles in the test skin are stretched out and a greater surface of the teat 120 is exposed to the injection cleaning. Also, the vacuum may stimulate pre-milking of the teat 120.

Further the teat cleaning cup 130 may comprise at least one cavity 299, wherein a thread insert may be inserted in some embodiments. Thereby, a releasable fastening of the lower part 230 of the teat cleaning cup 130 with the teat cleaner may be enabled.

Figure 3:
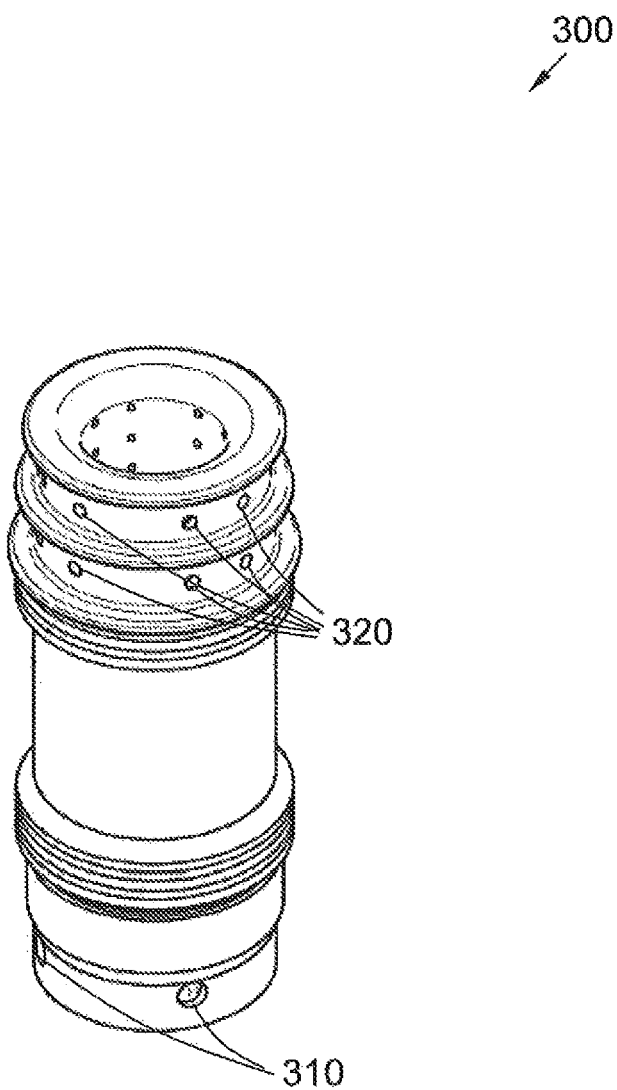
FIG. 3 illustrates an embodiment of the teat cleaner.

FIG. 3 illustrates a teat cleaner 300, after having been moulded. The teat cleaner 300 may comprise a set of apertures 320 in the exterior part 220 of the teat cleaner 300 in some embodiments. These apertures are resulting from the manufacturing process, where a pin may be inserted for fixating a rod during a two-step moulding.

Further, the teat cleaner 300 comprises at least one aperture 310 in the teat cleaner 300, which aperture 310 connects channels 291, 292 of the second type of the channels, i.e. air channels, to ambient air via the respective aperture 310 in the teat cleaner 300.

The teat cleaner 300 comprises an inner body 270, forming a central cavity 280 configured to enclose the test 120 of the udder 110, wherein the inner body 270 comprises an inner surface 271, facing the central cavity 280. The inner body 270 also comprises an outer surface 272. Further, a set of apertures 275 extend from the outer surface 272 to the inner surface 271 of the inner body 270. The teat cleaner 300 also comprises an exterior part 220, enclosing the inner body 270. The teat cleaner 300 furthermore comprises a set of channels 291, 292, situated between the inner body 270 and the exterior part 220, which set of channels 291, 292 extend along a longitudinal direction of the teat cleaner 300 and connect to the set of apertures 275.

FIG. 4 illustrates a teat cleaning cup 130 in an embodiment, illustrating the different parts of the teat cleaning cup 130 and how they may interact with each other.

A teat cleaner cup collar 210 may be placed on the opening of the exterior part 220 of the teat cleaner 300, opposite to the drainage means 250. The teat cleaner cup collar 210 may be made in rubber, silicon or other similar elastic material. The teat cleaner cup collar 210 may seal against the teat 120 and/or the udder 110 of the animal 100. In addition, the teat cleaner cup collar 210 may cover the opening of the test cleaner 500, for covering a set of apertures 320 in the exterior part 220. An advantage therewith is that dirt is obstructed from entering into the apertures 320.

Further, a seal 235 is placed between the teat cleaner 300 and a lower part 230, removably attached to the teat cleaner 300. The lower part 230, which may be machine manufactured in some embodiments, may comprise a first cleaning liquid valve 240 and a second cleaning liquid valve 260 and a drainage means 250 for draining used cleaning liquid from the teat cleaning cup 130.

The first cleaning liquid valve 240 may be attached to a first subset of channels 291 and the second cleaning liquid valve 260 may be attached to a second subset of channels 292, which channels all are of the second type of channels, i.e. liquid channels.

The drainage means 250 may be attached to the central cavity 280.

The seal 235, which may be manufactured of a polymer, polysulfide polymers, silicone rubber, polymerceptan, polyurethane, synthetic rubber, nitrile rubber or similar material, comprises a first surface 231 facing the teat cleaner 300 and a second surface 232 facing the lower part 230. The seal 235 is configured to distribute liquid from the cleaning liquid valve 240, 260 of the lower part 230 into the channels 291, 292 in the teat cleaner 300.

According to some embodiments, the seal 235 may form at least one first set of apertures 401, 402, 403, 404, of at least a first aperture 401, 403 and a second aperture 402, 404, extending through the seal 235 from the first surface 231 to the second surface 232. Further, the seal 235 may form at least one recess 233, 234 in the second surface 232, connecting the first aperture 401, 403 to the second aperture 402, 404.

In some embodiments, the seal 235 forms the recess 233 of the first set of apertures 401, 402 receives liquid from the first cleaning liquid valve 240 and distribute the liquid via the first aperture 401 and the second aperture 402 to the first channel subset 291 in the teat cleaner 300; and the recess 234 of the second set of apertures 403, 404 receives liquid from the second cleaning liquid valve 260 and distribute the liquid via the first aperture 403 and the second aperture 404 to the second channel subset 292 in the teat cleaner 300 when the seal 235 is situated in a sealing position between the teat cleaner 300 and the lower part 230, during operation of the teat cleaning cup 130.

By distributing liquid via the recess 233, 234 in the seal 235, a complex solution of conduits for distributing the liquid is avoided.

In some alternative embodiments, the seal 235 may form an aperture 236 extending from the first surface 231 to the second surface 232 of the seal 235, configured for guiding used cleaning liquid from the test cleaner 300 to the drainage means 250 of the lower part 230 when the seal 235 is situated in a sealing position between the teat cleaner 300 and the lower part 230, during operation of the teat cleaning cup 130.

As previously mentioned, the lower part 230 may be removably attached to the teat cleaner 300 by at least one fastening element, such as threaded fastener, e.g. a screw, a bolt, etc. However, also other alternative fasteners may be utilised such as e.g. a snap fastener, an R-clip pin, a split pin, a latch, a magnetic fastener, etc.

By having the lower part 230 removably attached to the teat cleaner 300, it becomes easy to open the teat cleaning cup 130 for cleaning and for changing the seal 235.

The seal 235 may in at least some such embodiments form one fastening element aperture 237, 238 extending through the seal 235 from the first surface 231 to the second surface 232, for each fastening element.

FIG. 6 illustrates a seal 235 according to an embodiment. On the upper part of FIG. 5, the second surface 232 of the seal 235 where the at least one recess 233, 234 is depicted connecting the first aperture 401, 403 to the second aperture 402, 404.

In some possible embodiments, the seal 235 may comprise at least one protrusion 601, 502, protruding from the first surface 231 and fitting into the teat cleaner 300, e.g. Into one of the air channels or a recess in the teat cleaner 300. Thereby, it becomes easier to mount the seal 235 correctly, also during bad visibility conditions, or when changed by an inexperienced person.

The terminology used in the description of the embodiments as illustrated in the accompanying drawings is not intended to be limiting of the described seal 235; and/or teat cleaning cup 130. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage.

The invention claimed is:

1. A seal (235) in combination with a teat cleaning cup (130) for cleaning a teat (120) of an udder (110), wherein the cleaning cup (130) comprises a teat cleaner (300) having an exterior part (220) that encloses an inner body (270) that forms a central cavity (280) configured to enclose the teat (120), the teat cleaner (300) further having a set of channels (291, 292) located between the exterior part (220) and the inner body (270), the set of channels (291, 292) extending along a longitudinal direction of the teat cleaner (300), the inner body (270) comprising a set of apertures (275) that connect the central cavity (280) to the set of channels (291, 292), and wherein the cleaning cup (130) further comprises a lower part (230) removably attached to the teat cleaner (300), which lower part (230) comprises at least one cleaning liquid valve (240, 260) connectable to a cleaning liquid supply, and a drain (250) for draining used cleaning liquid from the teat cleaner (300), wherein the set of channels (291, 292) and the set of apertures (275) provide a fluid path for the cleaning liquid supply to flow from the at least one cleaning liquid valve (240, 260) into the central cavity (280) for spraying the teat (120) with the cleaning liquid, wherein the seal is located between the teat cleaner (300) and the lower part (230), and the seal (235) comprises a first surface (231) facing the teat cleaner (300) and a second surface (232) facing the lower part (230), the seal (235) including at least a first aperture (401, 403) in fluid communication with the at least one cleaning liquid valve (240, 260) to receive the cleaning liquid from the at least one cleaning liquid valve (240, 260) and distribute the cleaning liquid from the at least one cleaning liquid valve (240, 260) into the set of channels (291, 292) in the teat cleaner (300) and via the set of apertures (275) in the inner body (270) of the teat cleaner (300) to the central cavity (280) for spraying the teat (120) with the cleaning liquid, wherein the seal (235) includes at least one first set of apertures (401, 402, 403, 404) which include the at least a first aperture (401, 403) and a second aperture (402, 404) extending through the seal (235) from the first surface (231) to the second surface (232), and wherein the seal (235) forms at least one recess (233, 234) in the second surface (232), connecting the first aperture (401, 403) to the second aperture (402, 404).

2. The seal (235) in combination with the teat cleaning cup (130) according to claim 1, wherein the at least one cleaning liquid valve (240, 260) in the lower part (230) comprises a first cleaning liquid valve (240) and a second cleaning liquid valve (260), each of the first cleaning liquid valve (240) and the second cleaning liquid valve (260) being connectable to the cleaning liquid supply; and wherein the set of channels (291, 292) in the teat cleaner (300) comprises a first channel subset (291) and a second channel subset (292); and wherein the seal (235) includes a first group of apertures (401, 402) and a second group of apertures (403, 404), wherein each of the first and second groups of apertures (401, 402, 403, 404) comprises the at least one first aperture (401, 403) and the second aperture (402, 404) and the at least one recess (233, 234) connecting the at least one first aperture (401, 403) to the second aperture (402, 404), respectively; and wherein the at least one recess (233) of the first group of apertures (401, 402) receives liquid from the first cleaning liquid valve (240) and distribute the liquid via the first aperture (401) and the second aperture (402) to the first channel subset (291) in the teat cleaner (300); and the at least one recess (234) of the second group of apertures (403, 404) receives liquid from the second cleaning liquid valve (260) and distribute the liquid via the first aperture (403) and the second aperture (404) to the second channel subset (292) in the teat cleaner (300) when the seal (235) is situated in a sealing position between the teat cleaner (300) and the lower part (230), during operation of the teat cleaning cup (130).

3. The seal (235) in combination with the teat cleaning cup (130) according to claim 1, wherein the seal further comprises at least one protrusion (501, 502), protruding from the first surface (231) and fitting into the teat cleaner (300).

4. The seal (235) in combination with the teat cleaning cup (130) according to claim 1, wherein the seal comprises an aperture (236) extending from the first surface (231) to the second surface (232) of the seal (235), configured for guiding used cleaning liquid from the teat cleaner (300) to the drain (250) of the lower part (230) when the seal (235) is situated in a sealing position between the teat cleaner (300) and the lower part (230), during operation of the teat cleaning cup (130).

5. The seal (235) in combination with the teat cleaning cup (130) according to claim 1, wherein the lower part (230) is removably attached to the teat cleaner (300) by at least one fastening element, and wherein the seal (235) forms one fastening element aperture (237, 238) extending through the seal (235) from the first surface (231) to the second surface (232), for each fastening element.

6. The seal (235) in combination with the teat cleaning cup (130) according to claim 1, wherein the seal is manufactured of a polymer.

7. A teat cleaning cup (130) for cleaning a teat (120) of an udder (110), which teat cleaning cup (130) comprises:
  a teat cleaner (300) comprising
    an inner body (270), forming a central cavity (280) configured to enclose a teat (120) of an udder (110), wherein the inner body (270) comprises
      an inner surface (271), facing the central cavity (280),
      an outer surface (272), and
      a set of apertures (275) extending from the outer surface (272) to the inner surface (271);
    an exterior part (220), enclosing the inner body (270); and
    a set of channels (291, 292) situated between the inner body (270) and the exterior part (220), which set of channels (291, 292) extend along a longitudinal direction of the teat cleaner (300) and connect to the set of apertures (275);
  a lower part (230) removably attached to the teat cleaner (300), which lower part (230) comprises
    at least one cleaning liquid valve (240, 260) connectable to a cleaning liquid supply, and
    a drain (250) for draining used cleaning liquid from the teat cleaner (300); and
  a seal (235) located between the teat cleaner (300) and the lower part (230), the seal (235) comprising a first surface (231) facing the teat cleaner (300) and a second surface (232) facing the lower part (230), the seal (235) including at least a first aperture (401, 403) in fluid communication with the at least one cleaning liquid valve (240, 260) to receive the cleaning liquid from the at least one cleaning liquid valve (240, 260) and distribute the cleaning liquid into the set of channels (291, 292) and via the set of apertures (275) to the central cavity (280) for spraying the teat (120) with the cleaning liquid, wherein the seal (235) includes at least one first set of apertures (401, 402, 403, 404) which include the at least a first aperture (401, 403) and a second aperture (402, 404) extending through the seal (235) from the first surface (231) to the second surface (232), and wherein the seal (235) forms at least one recess (233, 234) in the second surface (232), connecting the first aperture (401, 403) to the second aperture (402, 404).

8. The teat cleaning cup (130) according to claim 7, wherein a first subset of the set of channels (291, 292) are connectable to any of the at least one cleaning liquid valve (240, 260) while a second subset of the set of channels (291, 292) are connected to ambient air via at least one aperture (310) in the teat cleaner (300), thereby supplying the second subset of the set of channels (291, 292) with air of standard atmosphere pressure.

9. The teat cleaning cup (130) according to claim 8, wherein at least the set of apertures (275) connected to the first subset of the set of channels (291, 292) are angled tangentially with the central cavity (280) of the inner body (270).

10. The teat cleaning cup (130) according to claim 7, wherein the teat cleaner (300) comprises at least one threaded insert (237), connectable to a respective fastening element for removably attaching the lower part (230) to the teat cleaner (300).

11. The teat cleaning cup (130) according to claim 7, wherein the teat cleaner (300) is produced by a two-step injection moulding.

12. The teat cleaning cup (130) according to claim 7, further comprising:

a teat cleaner cup collar (210) mounted at an upper part (221) of the teat cleaner (300), opposite to the drain (250).

13. The teat cleaning cup (130) according to claim 12, wherein the upper part (221) of the teat cleaner (300) comprises a set of exterior flanges (225), at least partly circumventing the teat cleaner (300), and wherein the teat cleaner cup collar (210) comprises a set of recesses (212), configured to fit into the set of exterior flanges (225) of the teat cleaner (300) for fixating the teat cleaner cup collar (210) to the upper part (221) of the teat cleaner (300).

14. The teat cleaning cup (130) according to claim 12, comprising an edge (215) surrounding an opening of the teat cleaner cup collar (210), which opening is configured to enclose the teat (120), wherein the edge (215) is configured to physically remove dirt from the teat (120) when inserted into the central cavity (280) of the teat cleaning cup (130).

15. The teat cleaning cup (130) according to claim 7, comprising a handle (227).

16. A seal (235) of a teat cleaning cup (130) comprising a teat cleaner (300) and a lower part (230), the seal (235) comprising:

at least a first aperture (401, 403);

a first surface (231) configured for facing the teat cleaner (300) comprising an exterior part (220) that encloses an inner body (270) that forms a central cavity (280) configured to enclose the teat (120), a set of channels (291, 292) located between the exterior part (220) and the inner body (270), the set of channels (291, 292) extending along a longitudinal direction of the teat cleaner (300), the inner body (270) comprises a set of apertures (275) that connect the central cavity (280) to the set of channels (291, 292); and a second surface (232) configured for facing the lower part (230) of the teat cleaner (300), which lower part (230) comprises at least one cleaning liquid valve (240, 260) connectable to a cleaning liquid supply, and a drain (250) for draining used cleaning liquid from the teat cleaner (300), the set of channels (291, 292) and the set of apertures (275) providing a fluid path for the cleaning liquid supply to flow from the at least one cleaning liquid valve (240, 260) into the central cavity (280) for spraying the teat (120) with the cleaning liquid;

wherein with the seal located between the teat cleaner (300) and the lower part (230), the at least a first aperture (401, 403) is in fluid communication with the at least one cleaning liquid valve (240, 260) to receive the cleaning liquid from the at least one cleaning liquid valve (240, 260) and distribute the cleaning liquid into the set of channels (291, 292) and via the set of apertures (275) to the central cavity (280) for spraying the teat (120) with the cleaning liquid, and the seal (235) includes i) at least one first set of apertures (401, 402, 403, 404) which include the at least a first aperture (401, 403), ii) a second aperture (402, 404) extending through the seal (235) from the first surface (231) to the second surface (232), and iii) a recess (233, 234) in the second surface (232), connecting the first aperture (401, 403) to the second aperture (402, 404).

17. The seal (235) according to claim 16, wherein, the at least one first set of apertures (401, 402, 403, 404) includes a first group of apertures (401, 402) and a second group of apertures (403, 404), each of the first and second groups of apertures (401, 402, 403, 404) comprises the at least one first aperture (401, 403) and the second aperture (402, 404) and the recess (233, 234) connecting the at least one first aperture (401, 403) to the second aperture (402, 404), respectively, and the recess (233) of the first group of apertures (401, 402) receives liquid from a first cleaning liquid valve (240) and distributes the liquid via the first aperture (401) and the second aperture (402) to the first channel subset (291); and the recess (234) of the second group of apertures (403, 404) receives liquid from a second cleaning liquid valve (260) and distribute the liquid via the first aperture (403) and the second aperture (404) to the second channel subset (292) in the teat cleaner (300) with the seal (235) situated in a sealing position between the teat cleaner (300) and the lower part (230), during operation of the teat cleaning cup (130).

18. The seal (235) according to claim 16, wherein, the seal further comprises at least one protrusion (501, 502), protruding from the first surface (231) and fitting into the teat cleaner (300).

* * * * *